US011018347B2

(12) United States Patent
Dogan

(10) Patent No.: US 11,018,347 B2
(45) Date of Patent: May 25, 2021

(54) CYCLIC REGENERATION OF NANOSTRUCTURED COMPOSITES FOR CATALYTIC APPLICATIONS

(71) Applicant: The Curators of the University of Missouri, Columbia, MO (US)

(72) Inventor: Fatih Dogan, Rolla, MO (US)

(73) Assignee: The Curators of the University of Missouri, Columbia, MO (US)

(*) Notice: Subject to any disclaimer, the term of this patent is extended or adjusted under 35 U.S.C. 154(b) by 0 days.

(21) Appl. No.: 16/677,779

(22) Filed: Nov. 8, 2019

(65) Prior Publication Data
US 2020/0075963 A1 Mar. 5, 2020

Related U.S. Application Data

(63) Continuation of application No. 15/488,668, filed on Apr. 17, 2017, now Pat. No. 10,516,170.

(51) Int. Cl.
*H01M 4/00* (2006.01)
*H01M 4/90* (2006.01)
(Continued)

(52) U.S. Cl.
CPC ....... *H01M 4/9066* (2013.01); *H01M 4/8652* (2013.01); *H01M 4/8885* (2013.01);
(Continued)

(58) Field of Classification Search
None
See application file for complete search history.

(56) References Cited

U.S. PATENT DOCUMENTS

| 5,922,287 A | 7/1999 | Kato |
| 6,794,539 B2 | 9/2004 | Unverricht |
| (Continued) | | |

OTHER PUBLICATIONS

Sabolsky et al, in situ formation of a solid oxide fuel cell (SOFC) cermet anode by NiWO4 reduction, journal of power source, 237, 33-40 (Year: 2013).*

(Continued)

*Primary Examiner* — Stefanie J Cohen
(74) *Attorney, Agent, or Firm* — C. John Brannon; Brannon Sowers & Cracraft PC

(57) ABSTRACT

A cermet catalyst material, defining a matrix having interconnected open pores, the matrix selected from the group consisting of YSZ and CGO and defining a substrate, a ceramic coating having a general formula $A_yB_nO_x$ at least partially coating the pores, and a plurality of metal particles A at least partially embedded in the ceramic coating. A is selected from the group consisting of Co, Cu, Ce, Ni, Ti, and combinations thereof and B is selected from the group consisting of Mo, W, Ce, and combinations thereof. When the coating is in a first oxidizing atmosphere and at a temperature between 400 degrees Celsius and 800 degrees Celsius the metal particles are absorbed into the coating in the form of metal cations, giving the coating the general formulation $A_yB_nO_{x'}$. When the coating is in a reducing atmosphere and at a temperature between about 400 degrees Celsius and about 800 degrees Celsius the B metal cations emerge from the coating to yield a plurality of B metal particles at least partially embedded in the coating, wherein the reduced coating has a general formula $A_{y-z}B_nO_x$, wherein $y>z$ and $x'>x$.

8 Claims, 9 Drawing Sheets

(51) Int. Cl.
- H01M 4/86 (2006.01)
- H01M 8/1253 (2016.01)
- H01M 4/88 (2006.01)
- H01M 8/124 (2016.01)

(52) U.S. Cl.
CPC .. *H01M 8/1253* (2013.01); *H01M 2008/1293* (2013.01); *Y02E 60/525* (2013.01); *Y02P 70/56* (2015.11)

(56) References Cited

U.S. PATENT DOCUMENTS

| | | |
|---|---|---|
| 8,580,342 B2 | 11/2013 | Malecki |
| 2002/0005086 A1 | 1/2002 | Dorfman |
| 2005/0180875 A1 | 8/2005 | Kang |
| 2011/0065017 A1 | 3/2011 | Ha |
| 2013/0045437 A1 | 2/2013 | Chen |

OTHER PUBLICATIONS

Sabolsky et al.; In situ formation of a solid oxide fuel cell cermet anode by $NiWO_4$ reduction; Journal of Power Sources, 237, pp. 33-40; 2013.

\* cited by examiner

CYCLIC REGENERATION OF NANOSTRUCTURED COMPOSITES FOR CATALYTIC APPLICATIONS

CROSS-REFERENCE TO RELATED APPLICATIONS

This patent application claims priority to U.S. patent application Ser. No. 15/488,668, now U.S. Pat. No. 10,516,170, filed on Apr. 17, 2017, which claimed priority to then provisional patent application Ser. No. 62/325,206, filed on Apr. 20, 2016.

BACKGROUND

Nanosized particles of high surface area are useful in many catalytic applications. However, the progressive coarsening of such nanosized particles in environments of elevated temperatures tends to have an adverse effect on their catalytic performance. Long-term stability of solid oxide fuel cells (SOFC) and other high temperature electrochemical cells would be significantly improved by repetitive regeneration of nanostructured catalysts to mitigate the deleterious effects of particle growth under operating conditions. Thus, there remains a need for nanostructured catalysts that may survive repeated duty cycles and/or exhibit regenerative behavior. The present novel technology addresses this need.

DETAILED DESCRIPTION

Figure 1:
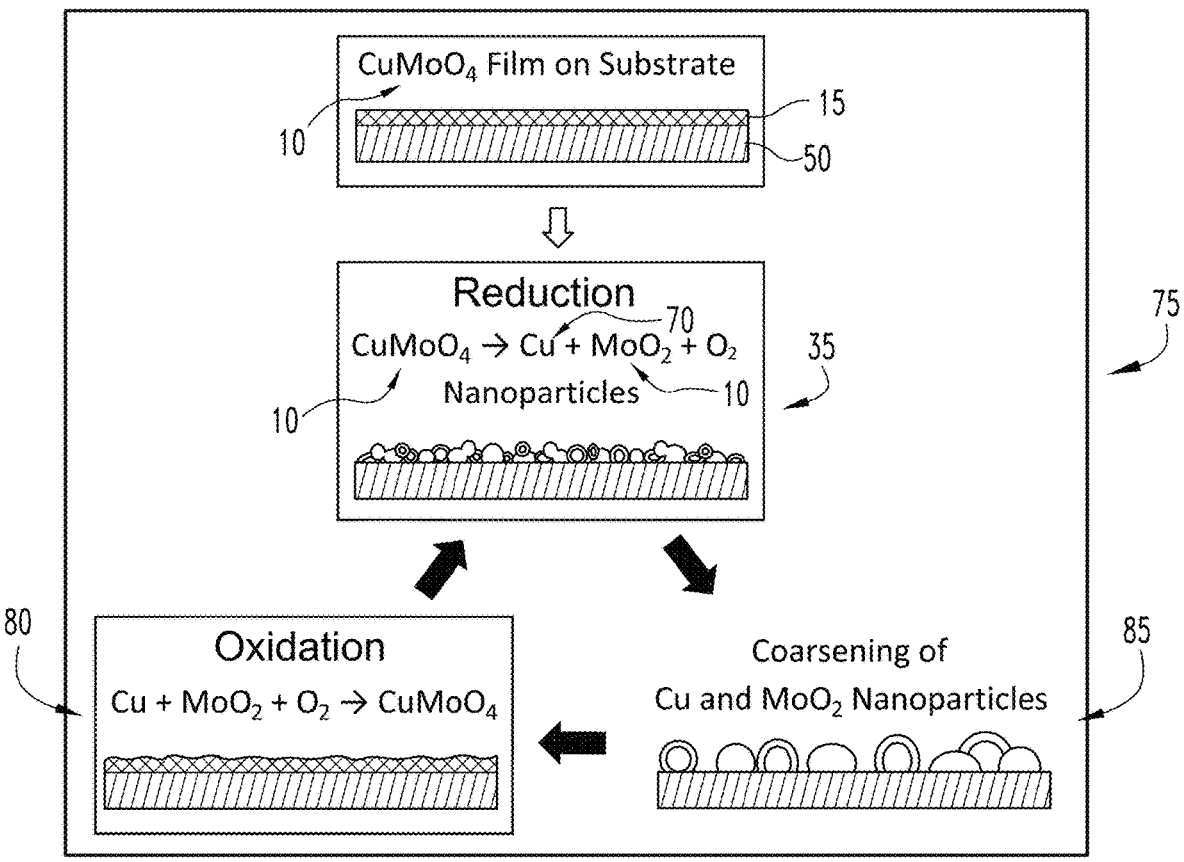
FIG. 1 schematically illustrates the coarsening and regeneration cycle for metal oxide catalysts.

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

Figure 2A:
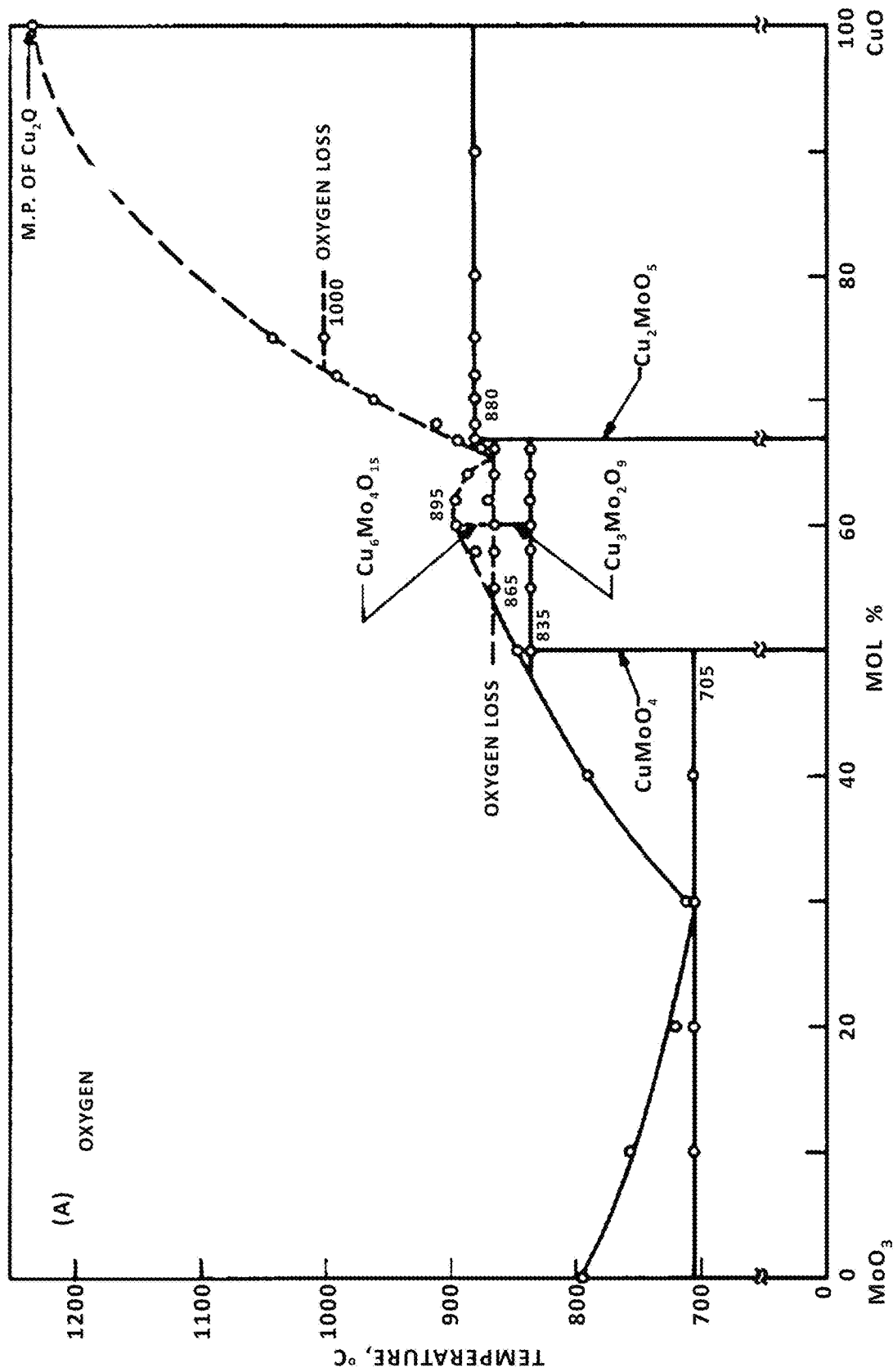
FIG. 2A is a phase diagram of the $MoO_3$—CuO system.
Figure 2B:
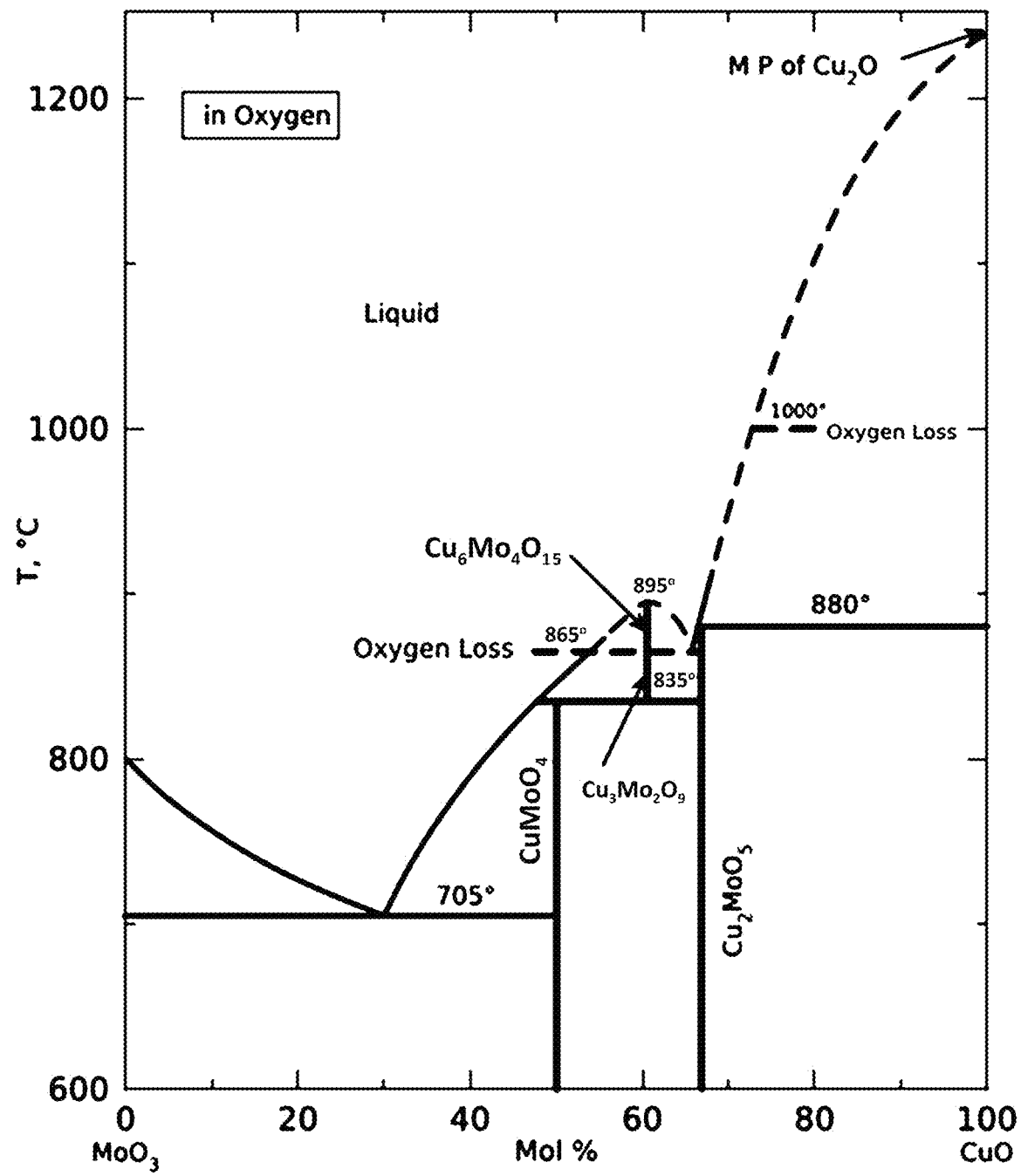
FIG. 2B is a phase diagram of the $MoO_3$—CuO system.
Figure 2C:
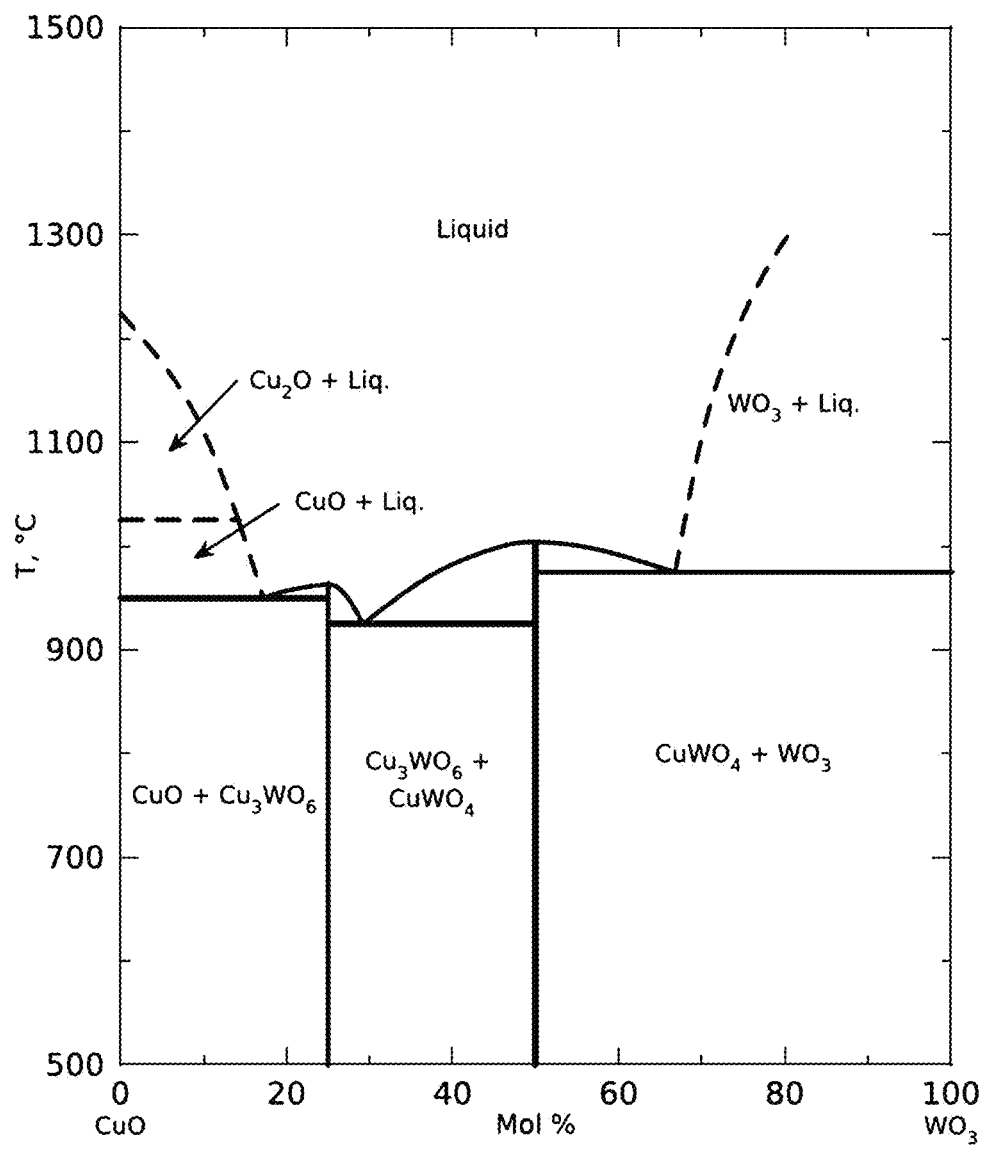
FIG. 2C is a phase diagram of the $WO_3$—CuO system.
Figure 3A:
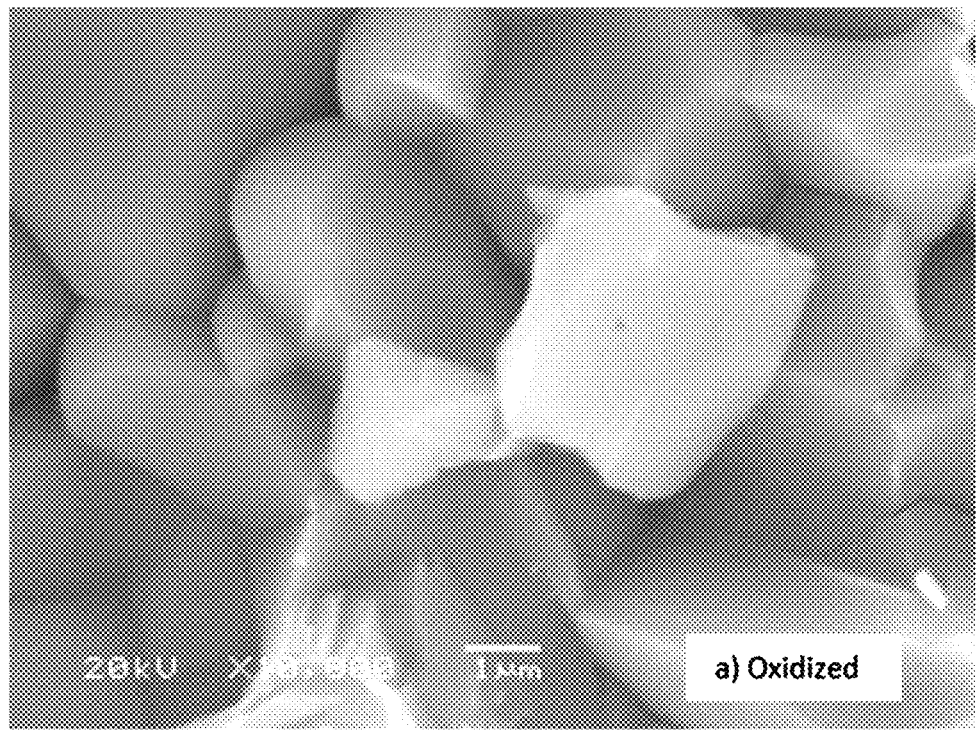
FIG. 3A is a photomicrograph of $CuMO_4$ after sintering in air at 800° C.
Figure 3B:
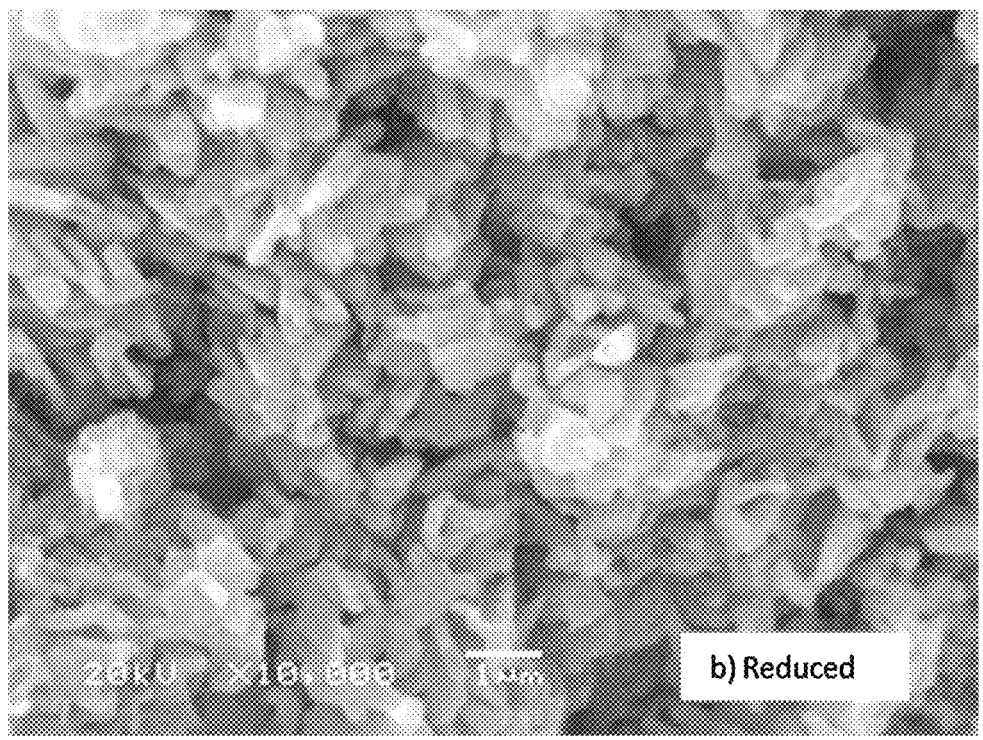
FIG. 3B is a photomicrograph of $CuMO_4$ after reduction at 400° C.
Figure 3C:
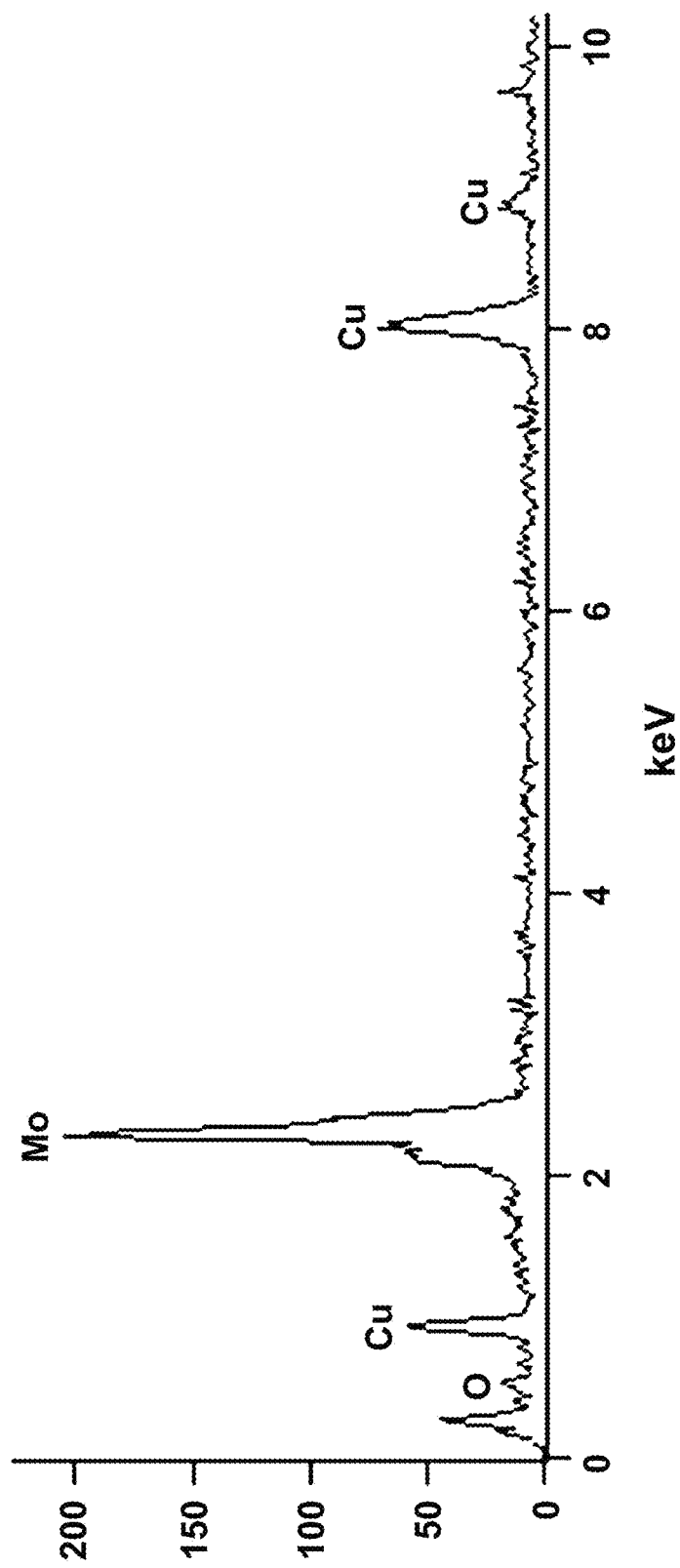
FIG. 3C is a schematic illustration of the EDS spectra for the sample of FIG. 3B.
Figure 4:
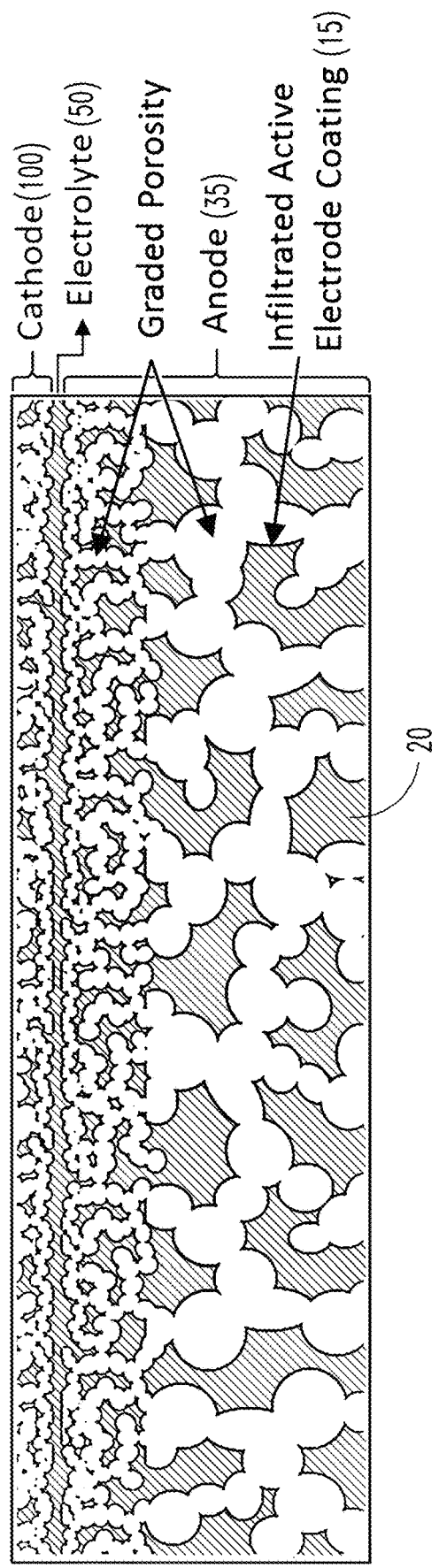
FIG. 4 is a schematic illustration of graded porosity of the electrodes for anode supported cell with a thin electrolyte layer, with anode and cathode infiltrated with catalytic precursor solutions under vacuum followed by heat treatment.
Figure 5:
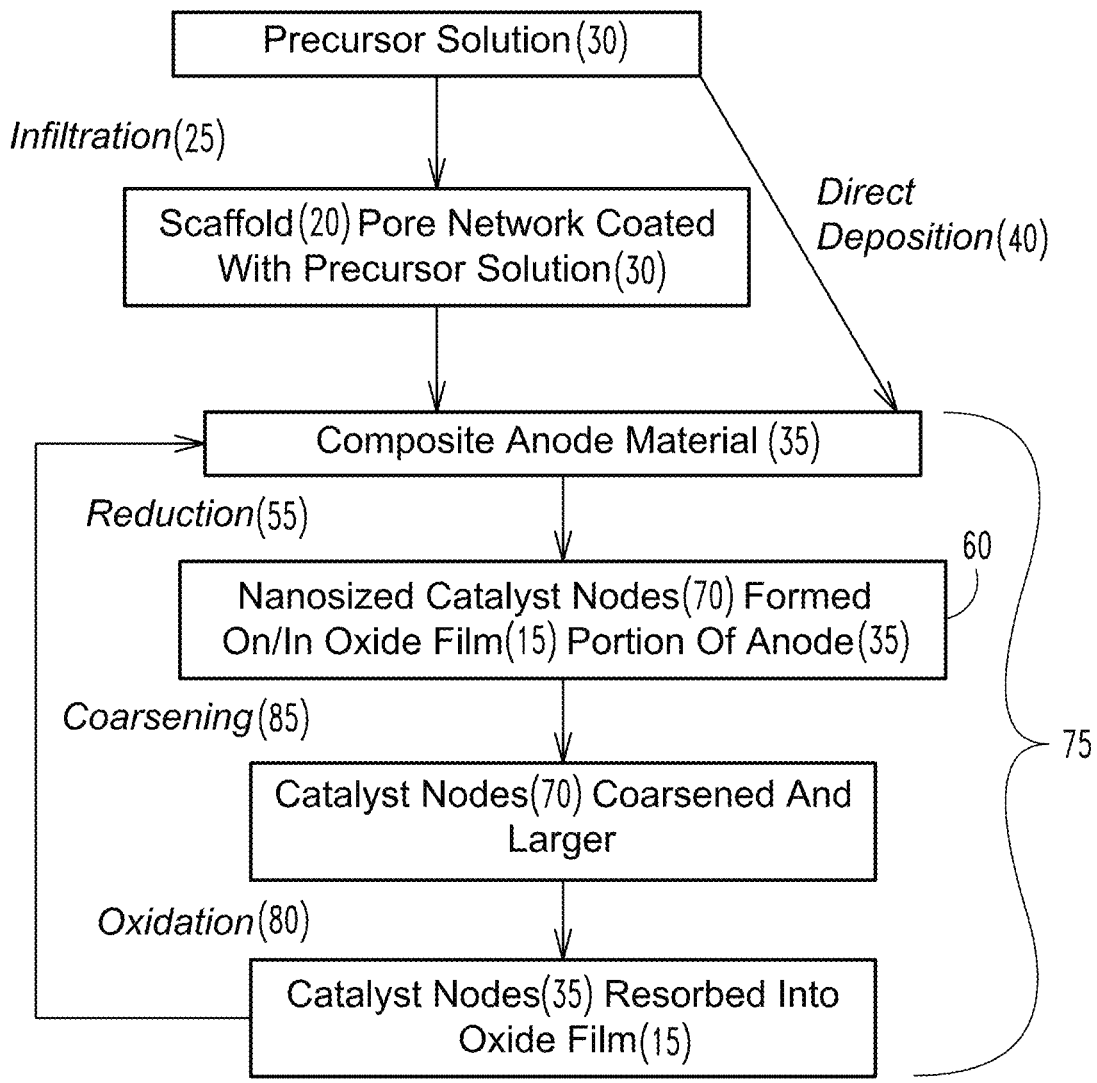
FIG. 5 is a flow chart schematically illustrating the preparation and operation of a cyclically regenerable composite oxide anode material.
Figure 6:
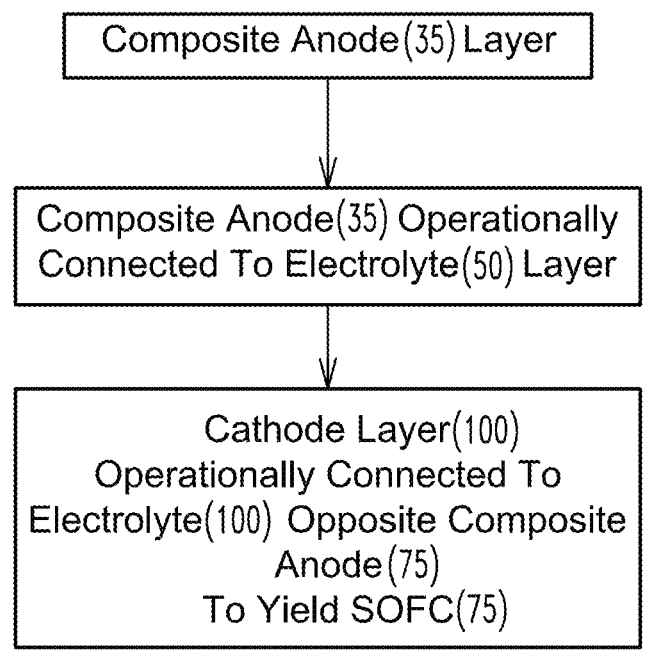
FIG. 6 is a flow chart schematically illustrating a solid oxide fuel cell (SOFC) incorporating a composite oxide anode material.

As illustrated in FIGS. 1-6, the novel technology relates to solid solutions of specific oxides 10 (such as $CuMoO_4$ and $CuWO_4$ solid solutions) that can be phase separated in reducing atmospheres to form nanosized particles 70 (such as Cu catalyst dispersed in $MoO_2$, Cu catalyst dispersed in $WO_2$) as well as methods for the implementation of the same. The novel technology specifically relates to (i) the deposition of oxide films 15 (such as $CuMoO_4$ and $CuWO_4$) into porous scaffolds 20 of yttria-stabilized zirconia (YSZ) by infiltration 25 of polymeric precursor solutions 30 to yield composite anodes 35, (ii) the direct deposition 40 of composite (such as $CuMoO_4$—YSZ and $CuWO_4$—YSZ) films 35 on dense YSZ electrolytes 50, (iii) the reduction 55 of oxides 10 to form redox stable nanostructured anodes 60 (such as Cu—$MoO_2$ and Cu—$WO_2$) having distributed nanoscale catalyst nodes 70 for operation of SOFC using hydrogen and hydrocarbon fuels, respectively, (iv) the redox process for cyclic regeneration 75 of nanostructured catalysts 70 by utilizing of surface/microstructural characterization techniques and theoretical modeling; and (v) improvement of the electrochemical performance of nanostructured SOFC anodes 35 as regenerated under cyclic redox conditions.

This cyclical regeneration 75 of catalyst material 70 exploits (i) reversible formation of nanostructured cermets from multicomponent oxides 15 that form solid solutions; and (ii) redox stability of solid oxide fuel cells (SOFC) 90 that can be reconditioned by restoring the catalytic activity of the anodes 35. Although SOFCs 90 have several advantages including fuel flexibility, high efficiency, co-generation of heat and power, their widespread use has not yet been realized primarily due to temperature-dependent materials issues. To address the high temperature instability of traditional anode materials, nanostructured composite coatings 35 are deposited by: (i) infiltration 25 of precursor solutions 30 into the porous scaffolding 20 of anode supported YSZ electrolyte 55; and (ii) direct deposition 40 of the precursor solutions ($CuMoO_4$—YSZ or $CuWO_4$—YSZ) using pore formers on the YSZ electrolyte 55. In the latter case, YSZ particles form a porous scaffold 20 surrounded by the $CuMoO_4$ or $CuWO_4$ phase during sintering in air. Under reducing atmosphere, $CuMoO_4$ and $CuWO_4$ decompose to Cu—$MoO_2$ and Cu—$WO_2$ cermets inside of the YSZ scaffold supporting the YSZ electrolyte. Percolation of the individual phases may be controlled by changing the stoichiometric ratio of the cations, and is a function of the size of the particles after the reduction process occurs, as coarsening of particles may lead to a loss of percolation. The interaction of the oxide particles with copper particles may be exploited to hinder sintering and coarsening 85 of the nanosized percolated copper particles at elevated temperatures, such as by Ostwald Ripening. Stability of the cermets (resistance to sintering) arising from the strength of interatomic bonds at the interface of the metal and oxide particles, such as in Cu—$MoO_2$ and Cu—$WO_2$ cermet systems, are exploited on YSZ scaffold or dense electrolyte. Further, variations of metal 70 and metal oxide 10 interfaces may be done to enhance their catalytic activity for oxidation of hydrogen and hydrocarbon fuels in solid oxide fuel cells, as the interfacial area between the nanoscale metal 70 and metal oxide 10 particles is much greater as there are more catalytically active sites as compared to coarsened particles. The size of metallic particles 70 are in the range of 1-500 nm during the initial operation conditions of the anode 35 after reduction. Their size become 0.5-3 micrometer when coarsened.

Sintering of nanoparticles 70 in SOFC anodes 60 that leads to deactivation of the catalyst may be reversed by oxidation/reduction redispersion process. A novel Cu—MoO$_2$ composite anode material 15 is utilized to form CuMoO$_4$ upon oxidation 80 and phase separates under a reducing atmosphere. Such anode structures 15, supported on porous solid electrolytes 50, may also be redox stable to prevent cracking or spallation of anodes during the cyclic oxidation/reduction process.

The following reactions are examples of what occurs during the redox process using H$_2$ and O$_2$ reducing and oxidizing gas atmospheres, respectively. Instead of hydrogen fuel, various hydrocarbon fuels C$_x$H$_y$, or CO gas can be utilized to control the reduction reaction.

Reduction: CuMoO$_4$+2H$_2$→Cu+MoO$_2$+2H$_2$O 400° C.
Oxidation: Cu+MoO$_2$+O$_2$→CuO+MoO$_3$→CuMoO$_4$ 600° C.

Depending on the Cu/Mo ratio of the compositions, other phases such as Cu$_2$MoO$_5$ and their combination with CuO may form according to the binary phase diagram. In oxygen, CuMoO$_4$ melts incongruently at 835° C., and at atmospheric pressure Cu$_3$Mo$_2$O$_9$ exists only between this temperature and 865° C., where it transforms to cuprous Cu$_6$MoO$_4$O$_{15}$, which melts congruently at 895° C. Cu$_2$MoO$_5$ melts peritectically at 880° C. The MoO$_3$—CuMoO$_4$ eutectic occurs near 30 mol % CuO at 705° C.

Traditional single-phase MoO$_2$ anode single cells have been operated at 750° C. for relatively short time frames. There are two reasons that this operating temperature is too high for a practical hydrocarbon fueled SOFC stack. First, though it is possible to test button cells without metallic balance of plant hardware in the fuel flow path, practical systems will utilize metal tubing and metal interconnects which will template carbon deposition at lower temperatures than those used in single cell tests. Secondly, molybdenum oxides have a very high vapor pressure at 750° C. and above, and may rapidly evaporate into the flowing anode exhaust stream over time or during the envisioned redox regeneration cycles. Lower temperature SOFC operation has been demonstrated using anode 35 supported thin film electrolyte 50 designs based on conventional SOFC material sets such as Ni—YSZ cermet anode 35, YSZ electrolyte 50, and LSM cathode 100. While molybdenum oxides have high vapor pressure at 750° C. and above, MoO$_2$ can be replaced with WO$_2$ (melting temperature: 1700° C.) for operation of SOFC at higher temperatures.

For the redispersion of sintered Cu and MoO$_2$ nanoparticles in anodes of SOFC, typical materials combinations exhibit (i) optimum Mo/Cu ratio to utilize the catalytic activity of MoO$_2$ efficiently as Cu by itself is a weak catalyst for oxidation hydrocarbon fuels, (ii) transport phenomena and kinetics during phase transformations as a function of temperature, (iii) percolation of Cu and MoO$_2$ depending on the molar ratio of both phases, (iv) effect of surface curvature of support material (flat vs porous) on the redox stability of the films, (v) nucleation/growth and dissolution of individual phases depending on temperature and time, and (vi) Cu/MoO$_2$ interface reactions and contribution of the interface to catalytic activity of the anode.

Of particular advantage are molybdenum oxides (such as MoO$_2$ and MoO$_3$) that can form solid solutions of multicomponent compounds with other metal oxides, typically in the form of thin films or coatings, and are compatible with the substrate materials (e.g. YSZ, doped ceria for SOFC) at elevated temperatures (specifically, they do not form undesired phases that may impede performance of high temperature electrochemical devices). Electrode materials should also be electrically conducting while they are catalytically active. Percolation of the conducting phase (for example, MoO$_2$ has high mixed electronic and ionic conductivity) is appreciated, while the phase of lower conductivity may be catalytically active. Some typical compounds include MoO$_2$—CuO; MoO$_2$—CeO; MoO$_2$—CoO; MoO$_2$—TiO$_2$; MoO$_2$—NiO; MoO$_2$—Y$_2$O$_3$; MoO$_2$—WO$_2$; MoO$_2$—CeO$_2$—ZrO$_2$; MoO$_2$—CuO—CeO$_2$—ZrO$_2$; CuO—CeO$_2$; NiO—Al$_2$O$_3$; NiO—Al$_2$O$_3$—ZrO$_2$; NiO—La$_2$O$_3$; NiO—WO$_3$ and CuO—WO$_3$.

Example 1

Electrolyte supported cells are prepared using yttria-stabilized zirconia (YSZ, 8 mol % Y$_2$O$_3$) substrates (thickness 100-200 μm) as a dense solid electrolyte, lanthanum strontium manganese (LSM) or lanthanum strontium cobalt ferrite (LSCF) as a cathode, and copper molybdate CuO—MoO$_x$ (x=0.5-3) as an anode. The Cu/Mo ratio of the oxide may vary within the solid solubility of both oxide components.

A porous YSZ tape (10-100 μm tick) is sintered on the anode site of the dense YSZ electrolyte that serves as a scaffold for infiltration of Cu—Mo—O precursor solutions. Porosity and pore size distribution of YSZ scaffolds are controlled with fugitive pore formers decomposing upon heating. Copper molybdate compositions with optimum Cu/Mo ratios are synthesized as polymeric precursor solutions using soluble copper and molybdenum salts with ethylene glycol for polymerization and butoxy ethanol as wetting agent. The concentrated solutions of optimized viscosity are deposited onto porous YSZ scaffold through vacuum infiltration into the pores and heat treatment processes. The thickness of the Cu—Mo—O coatings can vary typically between 10-1000 nanometers.

Precursor solution of LSM, LSCF, or other perovskites are deposited on the cathode site by applying of the same method as described for the anode or simply by screen printing of the cathode inks on the dense electrolyte.

The resultant cells are tested between 400° C. and 800° C. using hydrocarbon fuels (such as methane, propane or vaporized gasoline). The fuels are mixed with CO$_2$ and air to stabilize the MoO$_2$ phase (to avoid eutectic melting) during the reduction of Cu—Mo—O solid solution. The reduction process leads to formation of nanostructured Cu and MoO$_2$ particles (phases) of high catalytic activity required for oxidation of fuel efficiently and for achieving of high power densities of the cell. However, nanostructured particles tend to coarsen with time at operating temperatures and become catalytically less active, which, in turn, results in lowering of the power density of the cell.

Nanosized Cu and MoO$_2$ particles are regenerated by exposing the anode to an oxidizing atmosphere (such as air or flowing oxygen) so that both solid phases react, diffuse into each other and return to a Cu—Mo—O solid solution. After switching of air to fuel gas, Cu—Mo—O phase is reduced by regenerating of catalytically active nanosized Cu and MoO$_2$ particles. The anode coating within the YSZ scaffold is redox stable under repetitive cycling conditions of the cell to operate the fuel cell extended period of time with high efficiency using hydrocarbon fuels.

Example 2

The same procedure described in Example 1 can be implemented using doped ceria (such as CGO, Gd-doped CeO2) electrolytes instead of YSZ to operate the cells at lower temperatures.

Example 3

The Cu—Mo—O anode system above is replaced with a Cu—Ce—O system that can also form solid solutions at lower concentrations of CuO in CeO2 (typically, about <20% CuO). The same procedures described under Examples 1 and 2 are applied for Cu—CeO2 catalysts.

Example 4

The Cu—Mo—O system above is replaced with a Cu—W—O system that has relatively higher eutectic melting temperatures and lower vapor pressure but similar catalytic and electrical properties.

Example 5

An anode supported cell with a dense and thin layer of YSZ (or CGO) electrolyte (<10 μm) on a porous YSZ or CGO scaffold (thickness about 0.5 to 1 mm) as anode support is prepared. The cells are processed and operated as described in Examples 1-4.

General Examples

Metal Oxides: AO, BO, CO (Mixed in Various Ratios)

The following reactions depend on the oxygen partial pressure. Under strong reducing conditions (such as in $H_2$) oxide compounds can be reduced completely to metal. In case of hydrocarbon fuels, oxygen partial pressure can be relatively high so that thermodynamically less stables oxides are reduced while more stable metal oxides are partially reduced and can be oxygen deficient.

AO+BO: ABO→A+BO→ABO $CuO+MoO_2$:$CuMoO_4$ (or $Cu_2MoO_6$)→Cu+$MoO_2$→$CuMoO_4$ (or $Cu_2MoO_6$)

$NiO+MoO_2$: $NiMoO_4$→Ni+$MoO_2$→$NiMoO_4$ $CuO+WO_2$: $CuWO_4$ (or $Cu_3WO_6$)→Cu+$WO_2$→$CuWO_4$ (or $Cu_3WO_6$)

$NiO+WO_2$: $NiWO_4$→Ni+$WO_2$→$NiWO_4$

AO+BO+CO: ABCO→A+BCO→ABCO $CuO+MoO_2+WO_2$: $CuMoWO_x$→Cu+(Mo, W)$O_2$ ss→Cu-$MoWO_x$ $NiO+MoO_2+WO_2$: $NiMoWO_x$→Ni+(Mo, W)$O_2$ ss→Ni-$MoWO_x$

AO+BO: ABO (solid solution (ss))→A+BO (reduction)→ABO ss (reoxidation)

$MoO_2+TiO_2$: (Mo, Ti)$O_2$ ss→Mo+$TiO_2$ (reduction)→(Mo, Ti)$O_2$ ss (reoxidation) Reaction temperatures are typically between 200 degrees Celsius and 1000 degrees Celsius, more typically between 400 degrees Celsius and 800 degrees Celsius.

In general, the ceramic coating has a general formula $A_yB_nO_x$, with n, y and x having values that fulfill the stoichiometric obligations arising from the specific metal cations selected for A and B, and A and B are different. Typically, A is selected from the group consisting of Co, Cu, Ni, Ti, and combinations thereof and B is selected from the group consisting of Mo, W, Ce, and combinations thereof. More typically, A is selected from the group consisting of Cu, Ni, and Co, and B is selected from the group consisting of Mo and W. Still more typically, A is selected from the group consisting of Cu and Ni. When the coating is in a first oxidizing atmosphere (having a first oxygen partial pressure) and at a temperature between 400 degrees Celsius and 800 degrees Celsius, the A metal particles are absorbed into the coating in the form of metal cations, giving the coating the general formulation $A_yB_nO_{x'}$. When the coating is in a reducing atmosphere (having a second oxygen partial pressure less than the first oxygen partial pressure) and at a temperature between about 400 degrees Celsius and about 800 degrees Celsius the A metal cations emerge from the coating to yield a plurality of A metal particles at least partially embedded in the coating, wherein the reduced coating has a general formula $A_{y-z}B_nO_x$, wherein y>z and wherein x'>x.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

I claim:

1. A cermet catalyst material, comprising:
   a matrix having interconnected open pores, the matrix selected from the group consisting of YSZ and CGO and defining a substrate;
   a ceramic coating having a general formula $A_yB_nO_x$ at least partially coating the pores; and
   a plurality of metal particles A at least partially embedded in the ceramic coating;
   wherein A is selected from the group consisting of Co, Cu, Ce, Ni, Ti, and combinations thereof;
   wherein B is selected from the group consisting of Mo, W, Ce, and combinations thereof;
   wherein when the coating is in a first oxidizing atmosphere and at a temperature between 400 degrees Celsius and 800 degrees Celsius the plurality of metal particles A are absorbed into the coating in the form of metal cations, giving the coating the general formulation $A_yB_nO_{x'}$; and
   wherein when the coating is in a reducing atmosphere and at a temperature between about 400 degrees Celsius and about 800 degrees Celsius the A metal cations emerge from the coating to yield a plurality of A metal particles at least partially embedded in the coating, wherein the reduced coating has a general formula $A_{y-z}N_nO_x$;
   wherein y>z; and wherein x'>x.

2. The cermet catalyst material of claim 1 wherein the A metal particles have a dameter between 1 nanometer and 100 nanometers.

3. A method for preparing a catalytic cermet material, comprising:
   infiltrating an interconnected open pore network extending throughout a substrate member with a solution of A and B cations to yield an infiltrated substrate, wherein the substrate is selected from the group consisting of YSZ and CGO, wherein A is selected from the group consisting of Co, Cu, Ce, Ni, Ti, and combinations thereof; wherein B is selected from the group consisting of Mo, W, Ce, and combinations thereof, and wherein A and B are different;
   heating the infiltrated substrate to yield a coated substrate with an ABO layer coating at least some of the pores; and dispersing metal particles throughout the pore network;

wherein the metal particles are positioned on and in the coating;

wherein the coating has a general formula $A_{y-z}B_nO_x$;

wherein reducible A metal cations may be absorbed into the coating at elevated temperatures in an oxidizing atmosphere, driving the value of z to approach zero.

4. The method of claim 3 wherein absorbed A metal cations are desorbed from the coating upon exposure to elevated temperatures in a reducing atmosphere.

5. The method of claim 4 wherein the oxidizing atmosphere has a first oxygen partial pressure and wherein the reducing atmosphere has a second, lower oxygen partial pressure.

6. The method of claim 3 and further comprising:

operationally connecting the coated substrate to an electrolyte layer; and connecting a cathode layer to the electrolyte layer to define a fuel cell.

7. A cermet catalyst material, comprising:

a scaffolding having interconnected open pores, the scaffolding selected from the group consisting of YSZ and CGO;

a ceramic coating having a general formula $A_yB_nO_x$ at least partially coating the pores; and a plurality of metal particles A at least partially embedded in the ceramic coating;

wherein A is selected from the group consisting of Co, Cu, Ce, Ni, Ti, and combinations thereof;

wherein B is selected from the group consisting of Mo, W, Ce, and combinations thereof;

wherein metal particles are absorbed into the coating in the form of metal cations, giving the coating the general formulation $A_yB_nO_x$; and wherein when the coating is in a reducing atmosphere and at a temperature between 400 degrees Celsius and 800 degrees Celsius, A metal cations emerge from the coating to yield a plurality of A metal particles at least partially embedded in the coating, wherein the reduced coating has a general formula $A_{y-z}B_nO_{x'}$;

wherein y>z; and wherein x'>x.

8. The cermet catalyst material of claim 7 wherein the A metal particles have a diameter between 1 nanometer and 100 nanometers and wherein the A metal particles are positioned at grain boundaries, grain surfaces and in intragranular pores.

* * * * *

UNITED STATES PATENT AND TRADEMARK OFFICE
CERTIFICATE OF CORRECTION

PATENT NO. : 11,018,347 B2
APPLICATION NO. : 16/677779
DATED : May 25, 2021
INVENTOR(S) : Fatih Dogan Page 1 of 1

It is certified that error appears in the above-identified patent and that said Letters Patent is hereby corrected as shown below:

On the Title Page

Item (63):
"Continuation of application No. 15/488,668, filed on April 17, 2017, now Pat. no. 10,516,170."
Should read:
--Continuation of application No. 15/488,668, filed on Apr. 17, 2017, now Pat. No. 10,516,170, which claimed priority to provisional application No. 62/325,206, filed on Apr. 20, 2016.--

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*